United States Patent
Wu

(12) United States Patent (10) Patent No.: US 8,687,133 B2
Wu (45) Date of Patent: Apr. 1, 2014

(54) STEREOSCOPIC DISPLAY DEVICE WITH POLARIZED BACKLIGHTS FROM SINGLE LIGHT SOURCE AND DISPLAY PANEL HAVING ALTERNATING TWO VISIBLE IMAGES

(76) Inventor: Edzer Lienson Wu, Taipei (TW)

( * ) Notice: Subject to any disclaimer, the term of this patent is extended or adjusted under 35 U.S.C. 154(b) by 470 days.

(21) Appl. No.: 13/211,147

(22) Filed: Aug. 16, 2011

(65) Prior Publication Data

US 2013/0044274 A1 Feb. 21, 2013

(51) Int. Cl.
*G02F 1/1335* (2006.01)
*G03B 21/00* (2006.01)
*G02B 27/22* (2006.01)

(52) U.S. Cl.
CPC ................................ *G02B 27/22* (2013.01)
USPC .................... 349/15; 353/7; 353/8; 353/9

(58) Field of Classification Search
CPC .. G02B 27/22; G02B 27/2228; G02B 27/225; H04N 13/0402; H04N 13/0497; H04N 13/00; H04N 2013/0465; H04N 2213/002
USPC ............................................ 349/15; 353/7–9
See application file for complete search history.

(56) References Cited

U.S. PATENT DOCUMENTS

| 2010/0328433 | A1* | 12/2010 | Li | 348/46 |
| 2010/0328553 | A1* | 12/2010 | Ito | 348/751 |
| 2012/0057133 | A1* | 3/2012 | Robinson | 353/8 |

* cited by examiner

*Primary Examiner* — Hoan C Nguyen
(74) *Attorney, Agent, or Firm* — Saliwanchik, Lloyd & Eisenschenk

(57) ABSTRACT

A stereoscopic display device includes a display panel, two different polarized backlights and a synchronization module. The display panel is used to alternately generate first visible images and second visible images. The two different polarized backlights are to alternately illuminate the display panel so as to output the first visible images and second visible images, respectively. The synchronization module is used to synchronize the first visible images and second visible images with illumination periods of the respective polarized backlights.

20 Claims, 12 Drawing Sheets

STEREOSCOPIC DISPLAY DEVICE WITH POLARIZED BACKLIGHTS FROM SINGLE LIGHT SOURCE AND DISPLAY PANEL HAVING ALTERNATING TWO VISIBLE IMAGES

BACKGROUND OF THE INVENTION

The present invention relates to a display device. More particularly, the present invention relates to a display device and its displaying method.

Most stereoscopic display technology is creating or enhancing the illusion of depth in an image by presenting two offset images separately to the left and right eye of the viewer. In particular, a stereoscopic display would provide two different polarized left-eye visible image and right-eye visible image. When the viewer wears an active polarizer or a passive polarizer, his or her left eye and right eye can see left-eye visible image and right-eye visible image, thereby constituting a stereoscopic image in the viewer's brain.

For a conventional stereoscopic display technology applied on a LCD display device, the viewer needs to wear an active polarizer in order to see the left-eye visible images and right-eye visible images, respectively. The viewer who wears the active polarizer would easily feel uncomfortable and tired. Besides, the active polarizer is costly than the passive polarizer is.

Most conventional stereoscopic display technologies using passive polarizer are applied on the projector, e.g. the projectors in the cinema theater. It usually requires two projectors to provide left-eye visible images and right-eye visible images with half resolutions to constitute full resolution visible images. Also the left and right eye images have to be perfectly aligned to produce accurate stereoscopic image without shivering. It is neither convenient nor easy to install such stereoscopic display system with such requirements in a common home.

However, as more and more 3-D videos and games are available in the consumer electronic market, a stereoscopic display system is thus desired. For the forgoing reasons, there is a need for inventing an economic and comfortable stereoscopic display system.

BRIEF SUMMARY OF THE INVENTION

It is therefore an objective of the present invention to provide an improved display technology.

In accordance with the foregoing and other objectives of the present invention, a display device is provided to include a display panel, a backlight module, and a synchronization module. The display panel is for alternately generating first visible images and second visible images. The backlight module is for generating two different polarized backlights to alternately illuminate the display panel so as to output the first visible images and second visible images respectively. The backlight module includes a single light source, a first polarizing beam splitter for splitting a light beam from the single light source into two different polarized outgoing light beams, a first reflector, a second reflector, a first switch shutter disposed between the first reflector and the first polarizing beam splitter, a second switch shutter disposed between the second reflector and the first polarizing beam splitter, and a second polarizing beam splitter for directing the light beams from the first reflector or second reflector to the display panel. The synchronization module is coupled with the first switch shutter, the second switch shutter and the display panel for synchronizing the first visible images and second visible images with illumination periods of the respective polarized backlights.

In accordance with the foregoing and other objectives of the present invention, another display device is provided to include a display panel, a backlight module, and a synchronization module. The display panel is for alternately generating first visible images and second visible images. The backlight module is for generating two different polarized backlights to alternately illuminate the display panel so as to output the first visible images and second visible images respectively. The backlight module includes a single light source, a first polarizing beam splitter for splitting a light beam from the single light source into two different polarized outgoing light beams, a first reflector, a second reflector, a first switch shutter disposed between the first reflector and the first polarizing beam splitter, a second switch shutter disposed between the second reflector and the first polarizing beam splitter, and a transflective prism for directing the light beams from the first reflector or second reflector to the display panel. The synchronization module is coupled with the first switch shutter, the second switch shutter and the display panel for synchronizing the first visible images and second visible images with illumination periods of the respective polarized backlights.

According to an embodiment disclosed herein, the two different polarized backlights are two types of linearly-polarized backlights.

According to another embodiment disclosed herein, the two types of linearly-polarized backlights include a vertically-polarized backlight and a horizontally-polarized backlight.

According to another embodiment disclosed herein, the two different polarized backlights are two types of circularly-polarized backlights.

According to another embodiment disclosed herein, the two types of circularly-polarized backlights include a clockwise-polarized backlight and a counter-clockwise-polarized backlight.

According to another embodiment disclosed herein, the single light source includes a cold-cathode fluorescent lamp.

According to another embodiment disclosed herein, the single light source includes an LED light bar.

According to another embodiment disclosed herein, the display panel is a LCD display panel.

According to another embodiment disclosed herein, the display panel is a non-active illuminative display panel.

According to another embodiment disclosed herein, the first polarizing beam splitter is a Wollaston prism.

Thus, the display device disclosed herein utilizes two different types of polarized backlights to alternately illuminates the display panel for alternately generates first visible images and second visible images, thereby combining to form stereoscopic visible images or for two viewers who watch two different visible images.

It is to be understood that both the foregoing general description and the following detailed description are by examples, and are intended to provide further explanation of the invention as claimed.

DETAILED DISCLOSURE OF THE INVENTION

Figure 1:
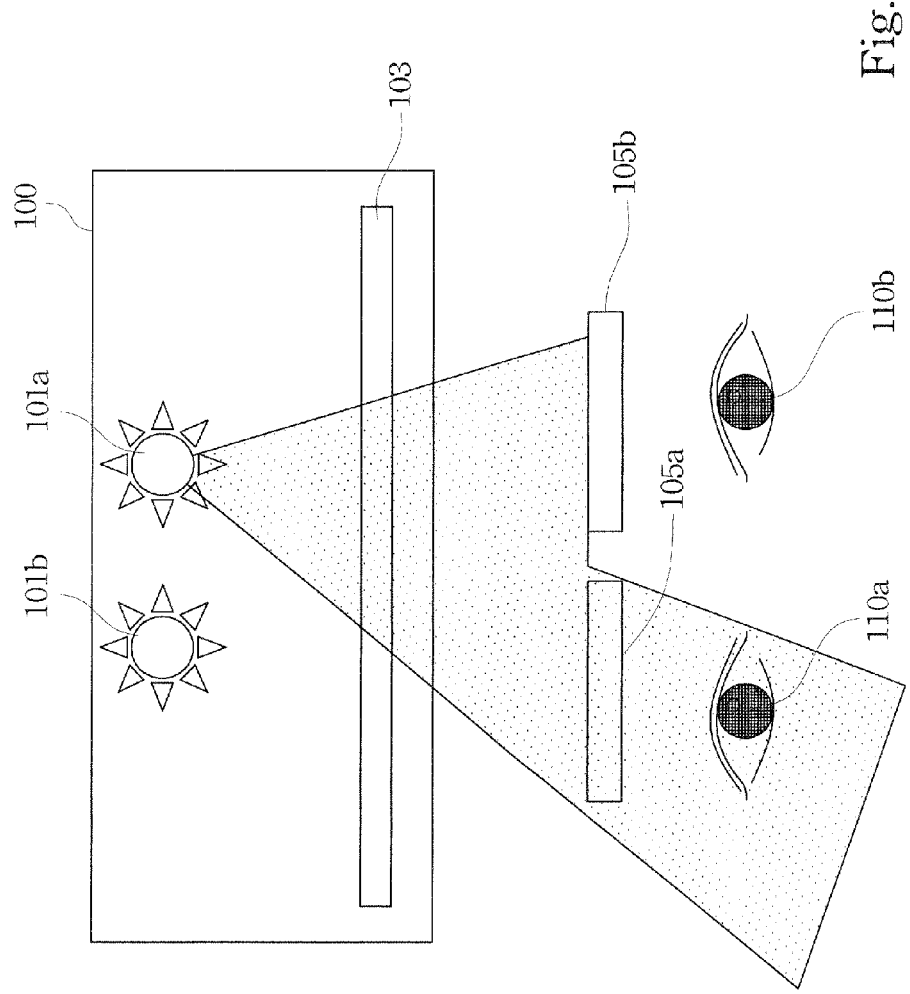
FIGS. 1 and 2 illustrate the operation of a stereoscopic display device according to a first embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
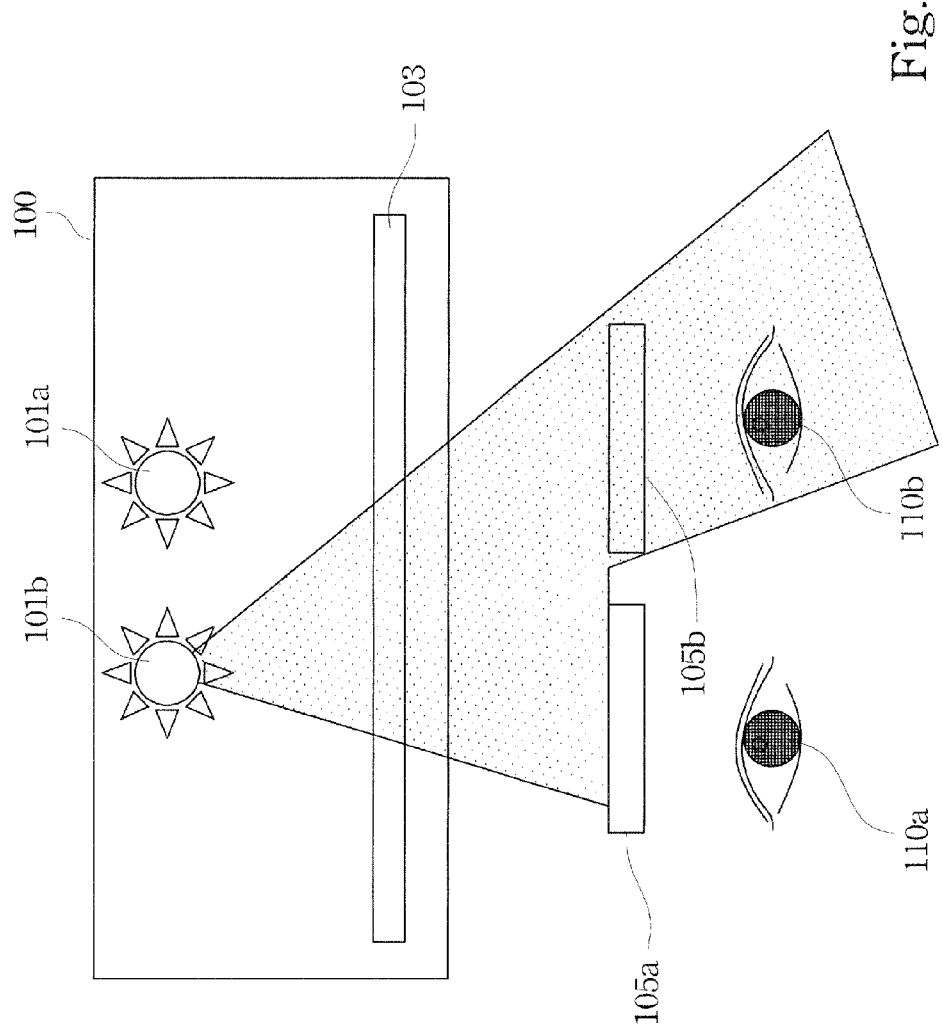

Reference is made to FIGS. 1 and 2, which illustrate the operation of a stereoscopic display device according to a first embodiment of this invention. A stereoscopic display device 100 includes two sets of backlights (101a, 101b), a display panel 103 and other essential optical components or control components. Two sets of backlights (101a, 101b) are two different types of polarized backlights, which illuminate the display panel 103 alternately, thereby producing left-eye visible images and right-eye visible images. The display panel 103 is a non-active illuminative display panel, e.g., a LCD display panel. That is, the display panel 103 needs the illumination from the backlights to output its visible images.

When the backlight 101a emits light (referring to FIG. 1), the backlight 101b does not emit light. Because the polarizing glasses 105a is optically polarized to permit the images carried by the backlight 110a to be visible by the left eye 110a. In contrast, the polarizing glasses 105h is optically polarized to prevent the images carried by the backlight 110a from being visible by the right eye 110b.

When the backlight 101b emits light (referring to FIG. 2), the backlight 101a does not emit light. Because the polarizing glasses 105b is optically polarized to permit the images carried by the backlight 110b to be visible by the right eye 110b. In contrast, the polarizing glasses 105a is optically polarized to prevent the images carried by the backlight 110b from being visible by the left eye 110a.

In an embodiment, two sets of backlights (101a, 101b) can be two types of linearly-polarized backlights, e.g., the backlight 101a is a vertically-polarized backlight while the backlight 101b is a horizontally-polarized backlight. Or, two sets of backlights (101a, 101b) can be two types of linearly-polarized backlights, which are equipped with two mutually orthogonal polarizations.

In an alternate embodiment, two sets of backlights (101a, 101b) can be two types of circularly-polarized backlights, e.g., the backlight 101a is a clockwise-polarized backlight while the backlight 101b is a counter-clockwise-polarized backlight.

Figure 3:
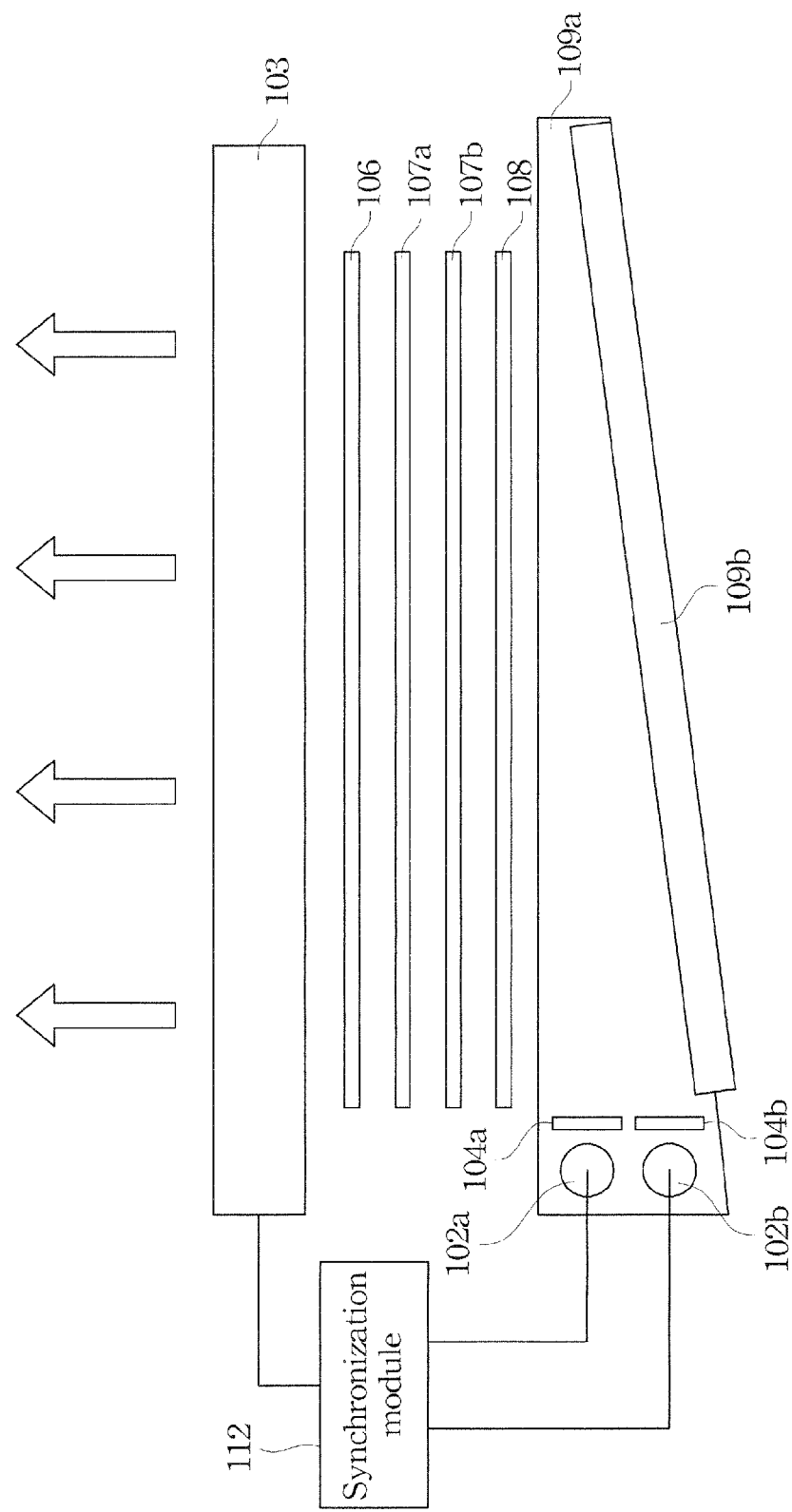
FIG. 3 illustrates a detailed structure of the stereoscopic display device according to the first embodiment of this invention.

Reference is made to FIG. 3, which illustrates a detailed structure of the stereoscopic display device according to the first embodiment of this invention. The stereoscopic display device includes a display panel 103, a synchronization module 112 and a backlight module and other optical components. The backlight module includes two light sources (102a, 102b), two polarizing lenses or filters (104a, 104b), a light guide plate 109a and a reflective sheet 109b. The polarizing lenses (104a, 104b) are two different types of polarized polarizing lenses, which is placed in front of the light sources (102a, 102b), thereby generating two different types of polarized backlights.

In an embodiment, the two polarizing lenses (104a, 104h) can be two different types of linearly-polarized polarizing lenses. e.g., the polarizing lens 104a is a vertically-polarized polarizing lens while the polarizing lens 104b is a horizontally-polarized polarizing lens.

In an alternate embodiment, the two polarizing lenses (104a, 104b) can be two different types of circularly-polarized polarizing lenses, e.g., the polarizing lens 104a is a clockwise-polarized polarizing lens while the polarizing lens 104b is a counter-clockwise-polarized polarizing lens.

In this embodiment, the light sources (102a, 102a) can be cold-cathode fluorescent lamps or LED light bars, etc. As illustrated in FIG. 3, the light sources (102a, 102a) and polarizing lenses (104a, 104b) are located at an edge of the light guide plate 109a. In an alternate embodiment, the light sources (102a, 102a) and polarizing lenses (104a, 104b) can be located at two opposite edges of the light guide plate 109a or behind the light guide plate 109a (not illustrated in the drawings). The reflective sheet 109b is used to direct light beams towards the display panel 103.

A synchronization module 112 is electrically connected with the display panel 103 and light sources (102a, 102b) for controlling the switching time of the light sources (102a, 102b) such that the two light sources (102a, 102b) can be respectively synchronized with the left-eye visible images and right-eye visible images, which are generated by the display panel 103, such that the viewer's left and right eyes can see the correct sequence of images.

In this embodiment, two prism sheets and two diffuser sheets are located between the display panel 103 and the backlight module. The two diffuser sheets (106, 108) are used to distribute the light uniformly and the two prism sheets (107a, 107b) are used to adjust the directions of the light beams. The choice of optical sheets between the display panel 103 and backlight module is not limited to the components illustrated in FIG. 3. A display designer can choose and arrange optical sheets according to actual demands.

Figure 4:
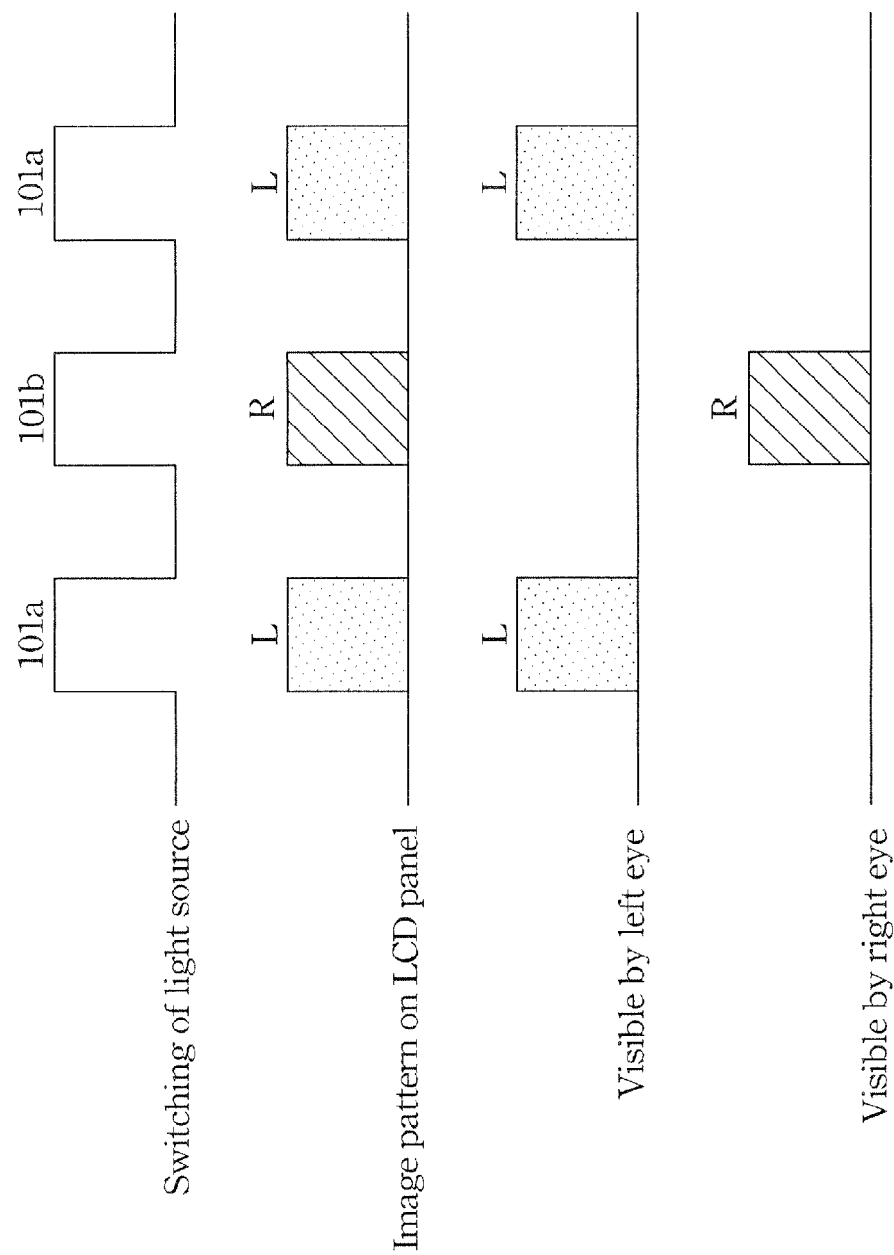
FIG. 4 illustrates an operation principle of the stereoscopic display device according to the first embodiment of this invention.

Reference is made to FIG. 4, which illustrates an operation principle of the stereoscopic display device according to the first embodiment of this invention. This drawing is used to describe the major function of the synchronization module 112. The backlight module has two polarized light sources (101a, 101b), which alternately illuminates the display panel. The display panel 103 alternately generates left-eye visible images (L) and right-eye visible images (R) with full resolutions. The major function of the synchronization module 112 is used to synchronize the illumination time of the light source 101a with the left-eye visible image (L) and synchronize the illumination time of the light source 101b with the right-eye visible image (R). Therefore, when the viewer wears the polarizer glasses, his or her right eye can see the right-eye visible image (R) while his or her left eye can see the left-eye visible image (L) so as to form a stereoscopic image.

Figure 5:
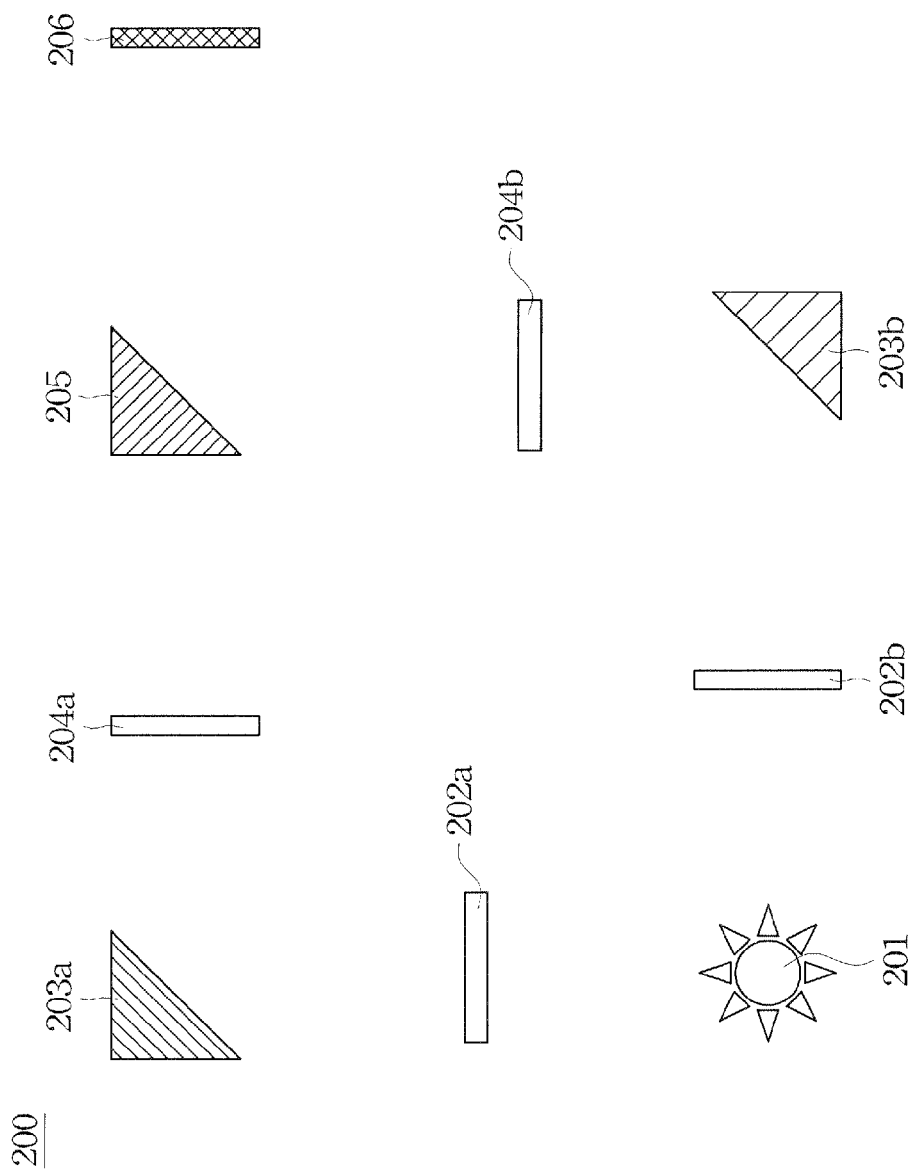
FIG. 5 illustrates a detailed structure of a stereoscopic display device according to a second embodiment of this invention.

Reference is made to FIG. 5, which illustrates a detailed structure of a stereoscopic display device according to a second embodiment of this invention. This embodiment is different from the embodiment of FIGS. 1-4 in the backlight design. In this embodiment, the backlight 200 includes a single light source 201, a single transflective prism 205 and two polarizing lens sets so as to generate two different types of polarized backlights. In particular, each polarizing lens set defines an independent polarized backlight for a display panel 206. Each polarizing lens set includes a reflector (203a or 203b), a switch shutter (202a or 202b) and a polarizing lens (204a or 204h). Each switch shutter (202a or 202b) is located between the reflector (203a or 203b) and the single light source 201. Each polarizing lens (204a or 204b) is located between the single transflective prism 205 and the reflector (203a or 203b).

Figure 6:
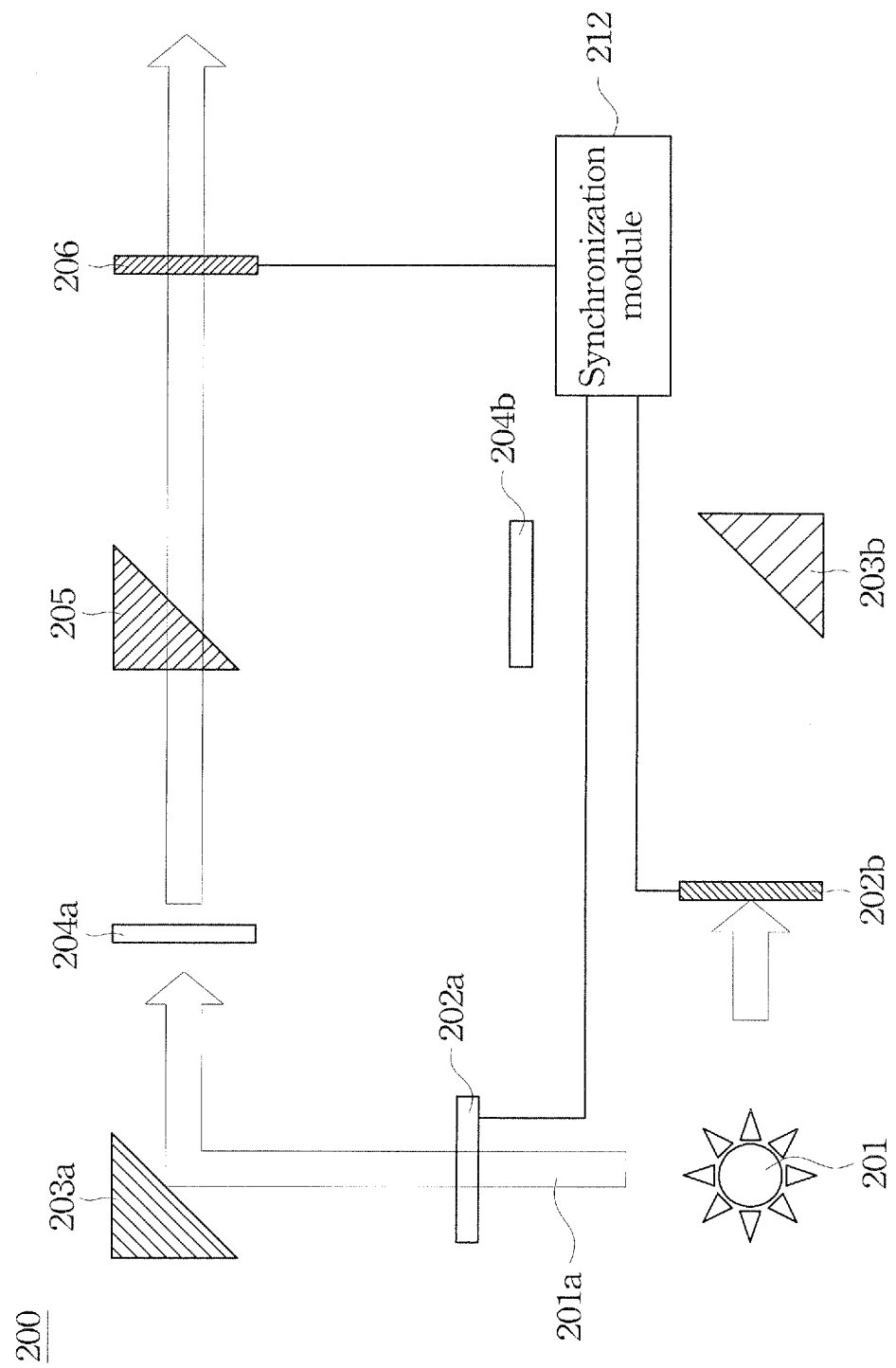
FIGS. 6 and 7 illustrate the operation of the stereoscopic display device according to the second embodiment of this invention.
Figure 7:
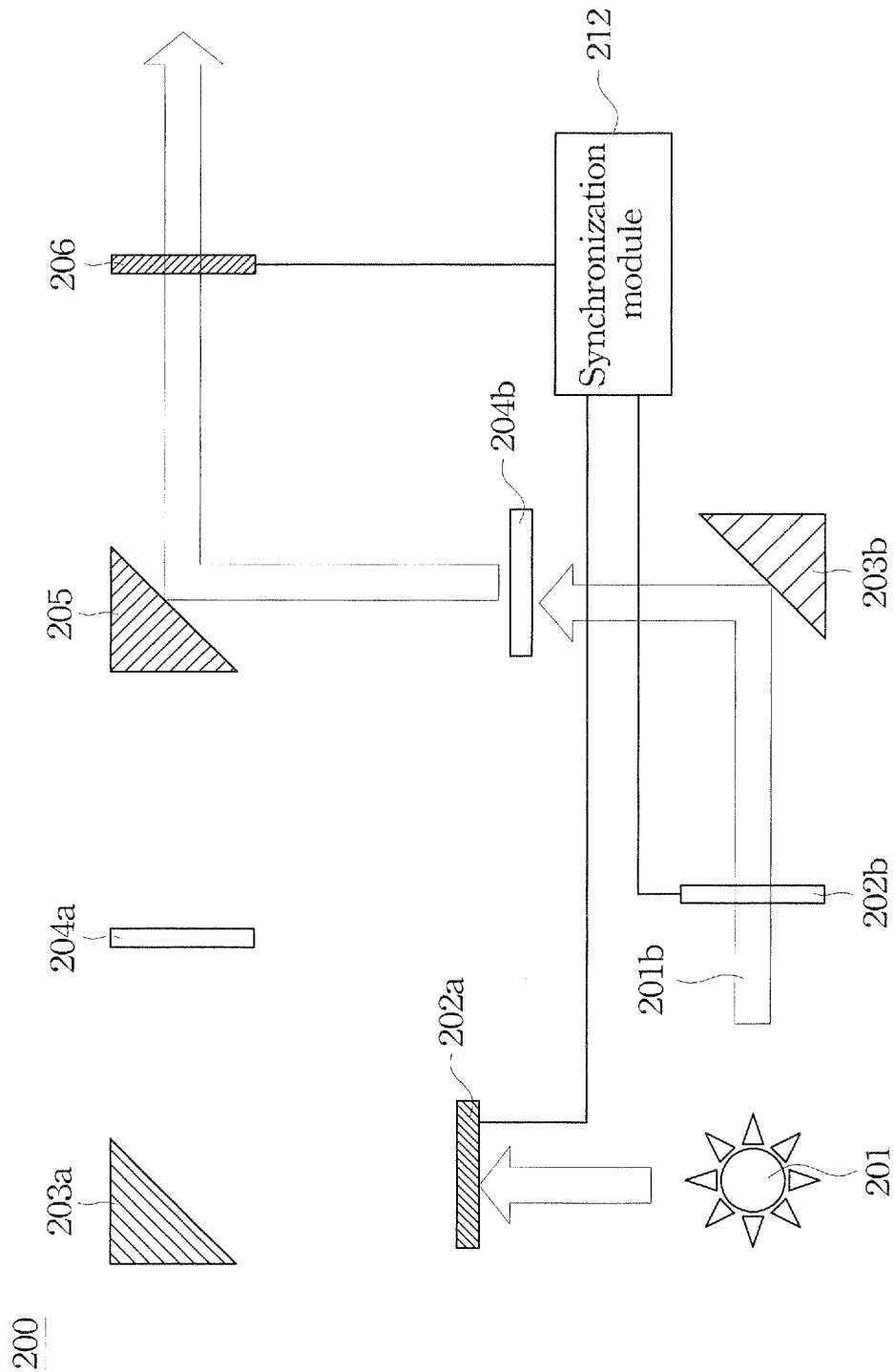

Reference is made to FIGS. 6 and 7, which illustrate an operation way of the stereoscopic display device according to the second embodiment of this invention. In FIG. 6, the switch shutter 202a permits the light beams of the light source 201 to pass through while the switch shutter 202b stops the light beams of the light source 201. Therefore, the backlight route 201a goes through the switch shutter 202a, reflected by the reflector 203a, filtered by the polarizing lens 204a, and then goes through the transflective prism 205 and the display panel 206.

In FIG. 7, the switch shutter 202b permits the light beams of the light source 201 to pass through while the switch shutter 202a stops the light beams of the light source 201. Therefore, the backlight route 201b goes through the switch shutter 202b, reflected by the reflector 203b, filtered by the polarizing lens 204b, reflected by transflective prism 205 and then goes through display panel 206.

Because the polarizing lenses (204a, 204b) are two different types of polarized polarizing lenses, thereby generating two different types of polarized backlights for the display panel 206.

In an embodiment, the two polarizing lenses (204a, 204b) can be two different types of linearly-polarized polarizing lenses, e.g., the polarizing lens 204a is a vertically-polarized polarizing lens while the polarizing lens 204b is a horizontally-polarized polarizing lens.

In an alternate embodiment, the two polarizing lenses (204a, 204b) can be two different types of circularly-polarized polarizing lenses, e.g., the polarizing lens 204a is a clockwise-polarized polarizing lens while the polarizing lens 204b is a counter-clockwise-polarized polarizing lens.

A synchronization module 212 is electrically connected with the display panel 206 and two switch shutters (202a, 202b) for controlling the switching time of the single light source 201 such that the two different types of polarized backlights can be respectively synchronized with the left-eye visible images and right-eye visible images, which are generated by the display panel 206, such that the viewer's left and right eyes can see the correct sequence of images.

Figure 8:
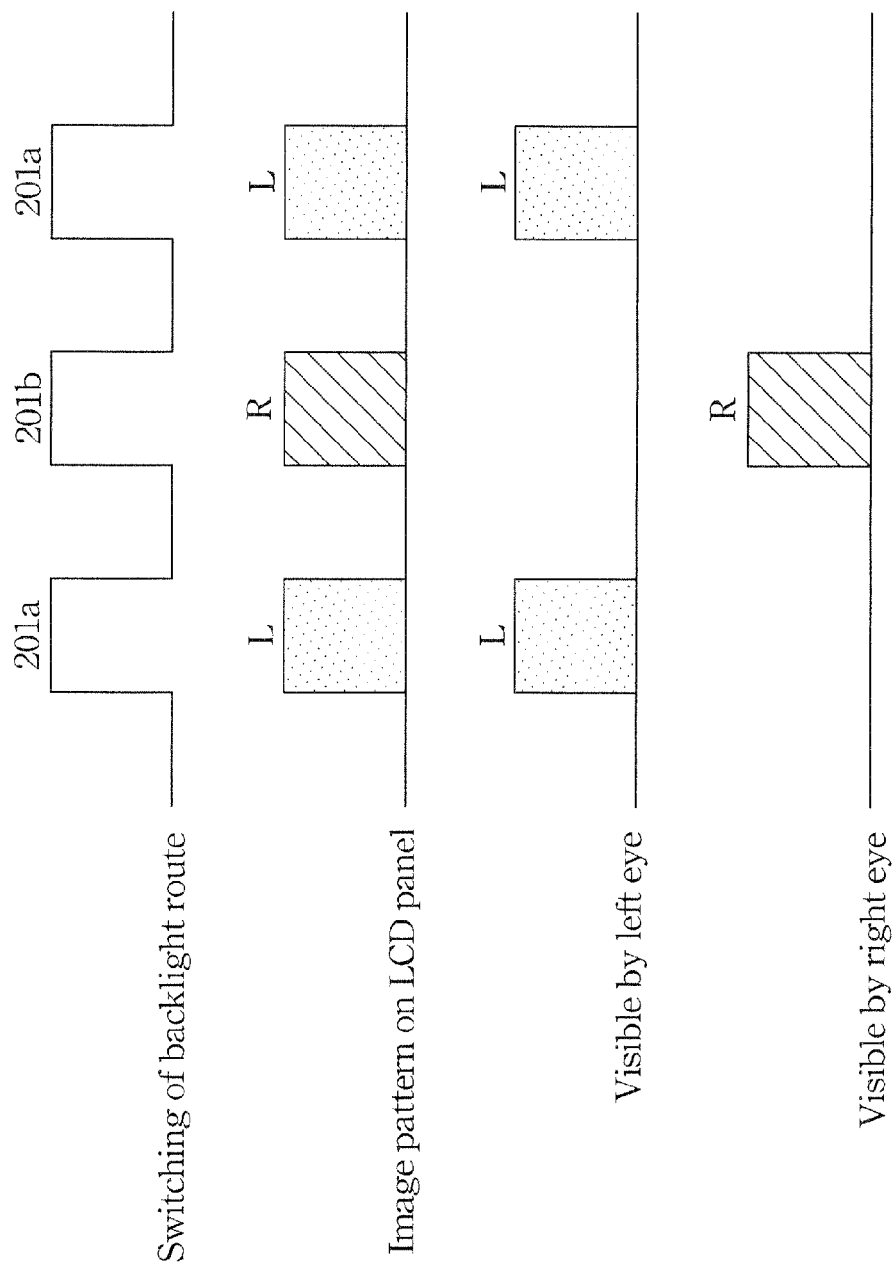
FIG. 8 illustrates an operation principle of the stereoscopic display device according to the second embodiment of this invention.

Reference is made to FIG. 8, which illustrates an operation principle of the stereoscopic display device according to the second embodiment of this invention. This drawing is used to describe the major function of the synchronization module 212. The light source 201 provides two different types of polarized backlights via two backlight routes (201a, 201b), which alternately illuminates the display panel 206. The display panel 206 alternately generates left-eye visible images (L) and right-eye visible images (R) with full resolutions. The major function of the synchronization module 212 is used to synchronize the switch cycle of the switch shutter 202a with the left-eye visible image (L) and synchronize the switch cycle of the switch shutter 202b with the right-eye visible image (R). Therefore, when the viewer wears the polarizer glasses, his or her right eye can see the right-eye visible image (R) while his or her left eye can see the left-eye visible image (L) so as to form a stereoscopic image.

Figure 9:
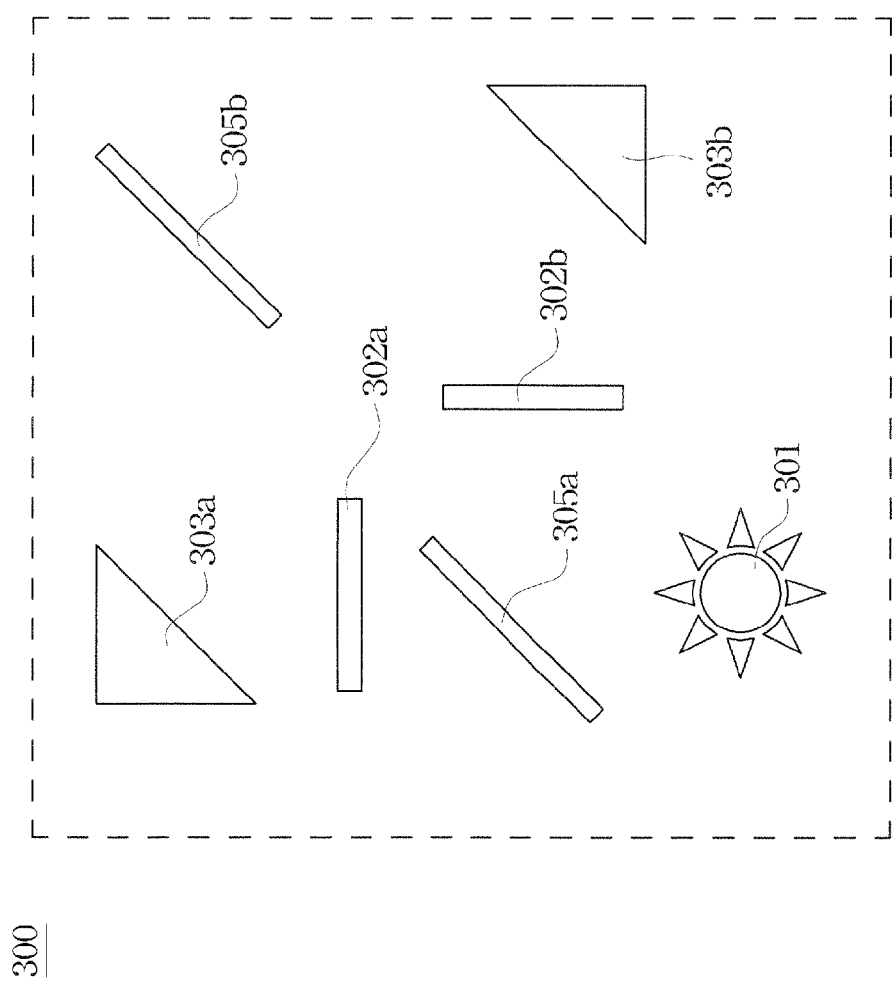
FIG. 9 illustrates a detailed structure of a stereoscopic display device according to a third embodiment of this invention.

Reference is made to FIG. 9, which illustrates a detailed structure of a stereoscopic display device according to a second embodiment of this invention. This embodiment is different from the second embodiment in the backlight design. In this embodiment, the backlight module 300 includes a single light source 301, a first polarizing beam splitter 305a, two switch shutters (302a, 302b), two reflectors (303a, 303b) and a second beam splitter 305b so as to generate two different types of polarized backlights. The first polarizing beam splitter 305a is used to split a light beam from the single light source 301 into two different polarized outgoing light beams towards two switch shutters (302a, 302b), respectively. The switch shutter 302a is located between the reflector 303a and the first polarizing beam splitter 305a while the switch shutter 302b is located between the reflector 303b and the first polarizing beam splitter 305a. The second beam splitter 305b is used to direct the light beams from two reflectors (303a, 303b) to the display panel. In this embodiment, the second beam splitter 305b is not necessarily a polarizing beam splitter. Besides, the second beam splitter 305b can be replaced by a transflective prism, e.g., the transflective prism 205 in FIG. 5.

Figure 10:
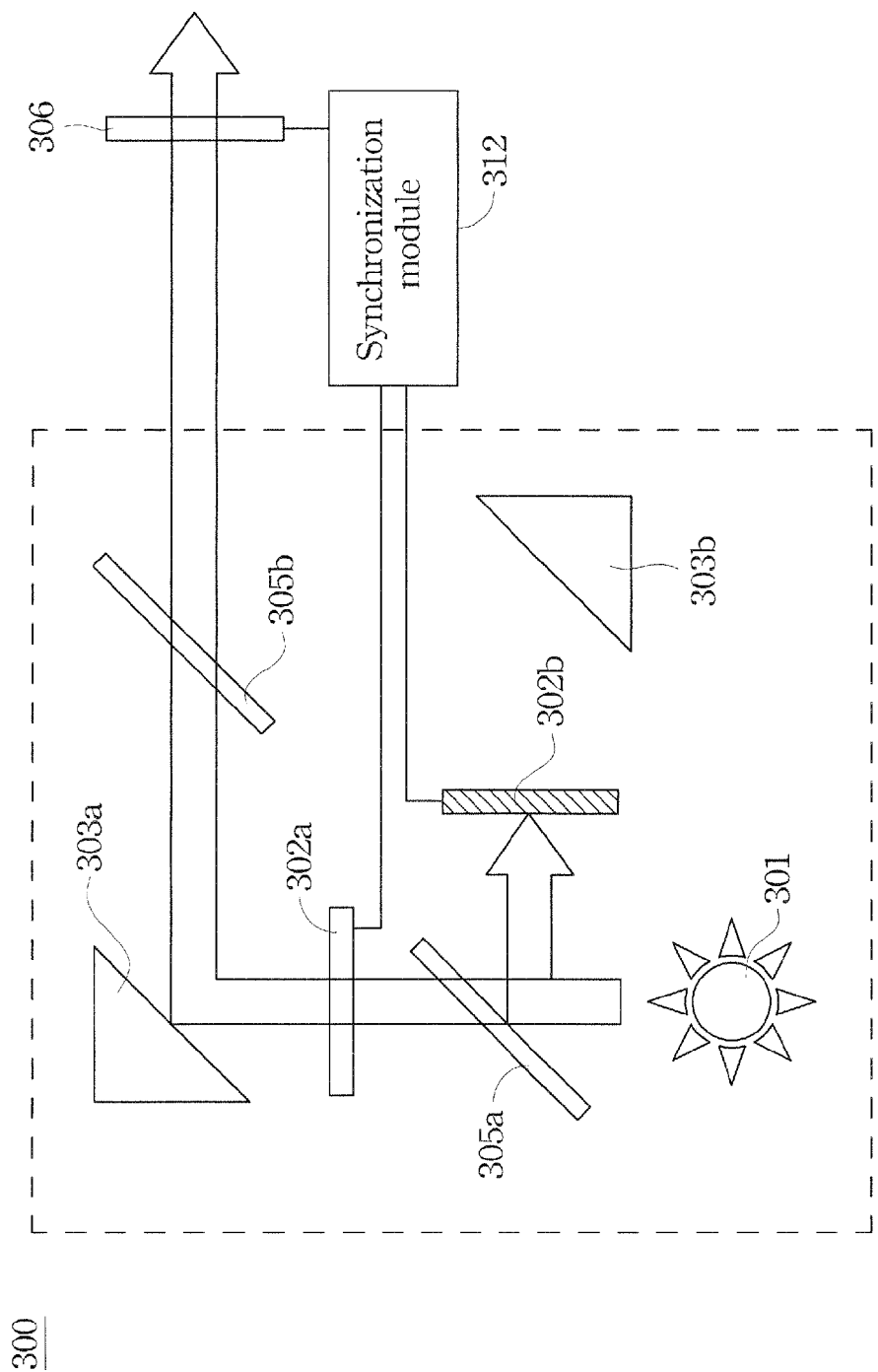
FIGS. 10 and 11 illustrate the operation of the stereoscopic display device according to the third embodiment of this invention.
Figure 11:
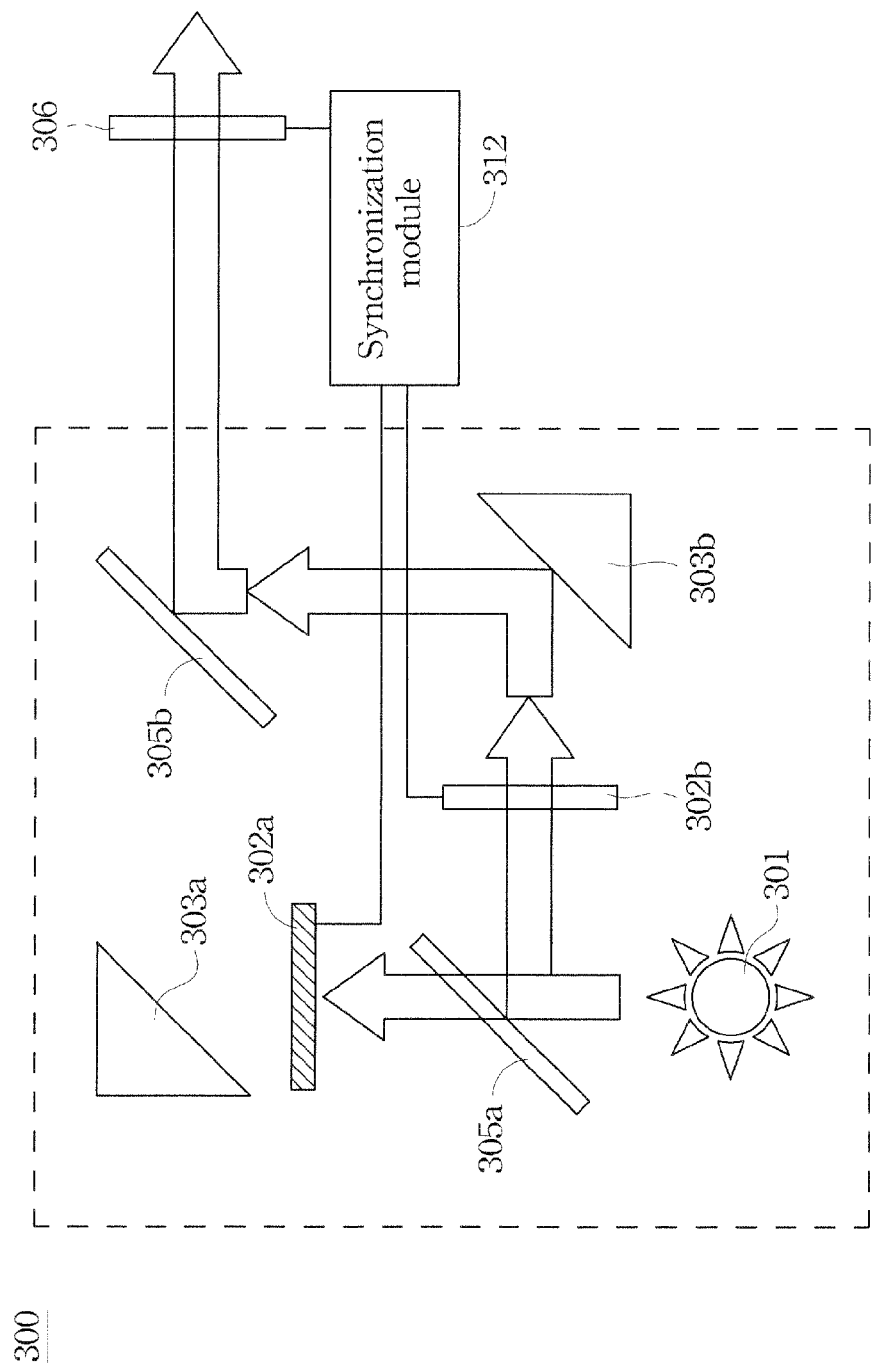

Reference is made to FIGS. 10 and 11, which illustrate an operation way of the stereoscopic display device according to the third embodiment of this invention. In FIG. 10, the switch shutter 302a permits the light beams of the light source 301 to pass through while the switch shutter 302b stops the light beams of the light source 301. Since the first polarizing beam splitter 305a has split a light beam from the single light source 301 into two different polarized outgoing light beams, the light beams along a backlight route 301a has been polarized after the first polarizing beam splitter 305a. Therefore, the backlight route 301a, filtered by the first polarizing beam splitter 305a, goes through the switch shutter 302a, reflected by the reflector 303a and then goes through the second beam splitter 305b and the display panel 306.

In FIG. 11, the switch shutter 302b permits the light beams of the light source 301 to pass through while the switch shutter 302a stops the light beams of the light source 301. Since the first polarizing beam splitter 305a has split the light beams of the single light source 301 into two different groups of polarized outgoing light beams, the light beams along a backlight route 301b has been polarized after the first polarizing beam splitter 305a. Therefore, the backlight route 301b, reflected and filtered by the first polarizing beam splitter 305a, goes through the switch shutter 302b, reflected by the reflector 303b, reflected by the second beam splitter 305b and then goes through the display panel 306.

Because the first polarizing beam splitter 305a can split the light beams of the single light source 301 into two different groups of polarized outgoing light beams, thereby generating two different types of polarized backlights for the display panel 306. In this embodiment, the first polarizing beam splitter 305a can be a Wollaston prism.

Because the backlight module 300 includes less optical components than the backlight 200, the backlight module 300 can output greater luminous intensity than the backlight 200 based upon the same single light source. Theoretically, the luminous intensity of the backlight module 300 is about two times of the luminous intensity of the backlight 200.

A synchronization module 312 is electrically connected with the display panel 306 and two switch shutters (302a, 302b) for controlling the switching time of the single light source 301 such that the two different types of polarized backlights can be respectively synchronized with the left-eye visible images and right-eye visible images, which are generated by the display panel 306, such that the viewer's left and right eyes can see the correct sequence of images.

Figure 12:
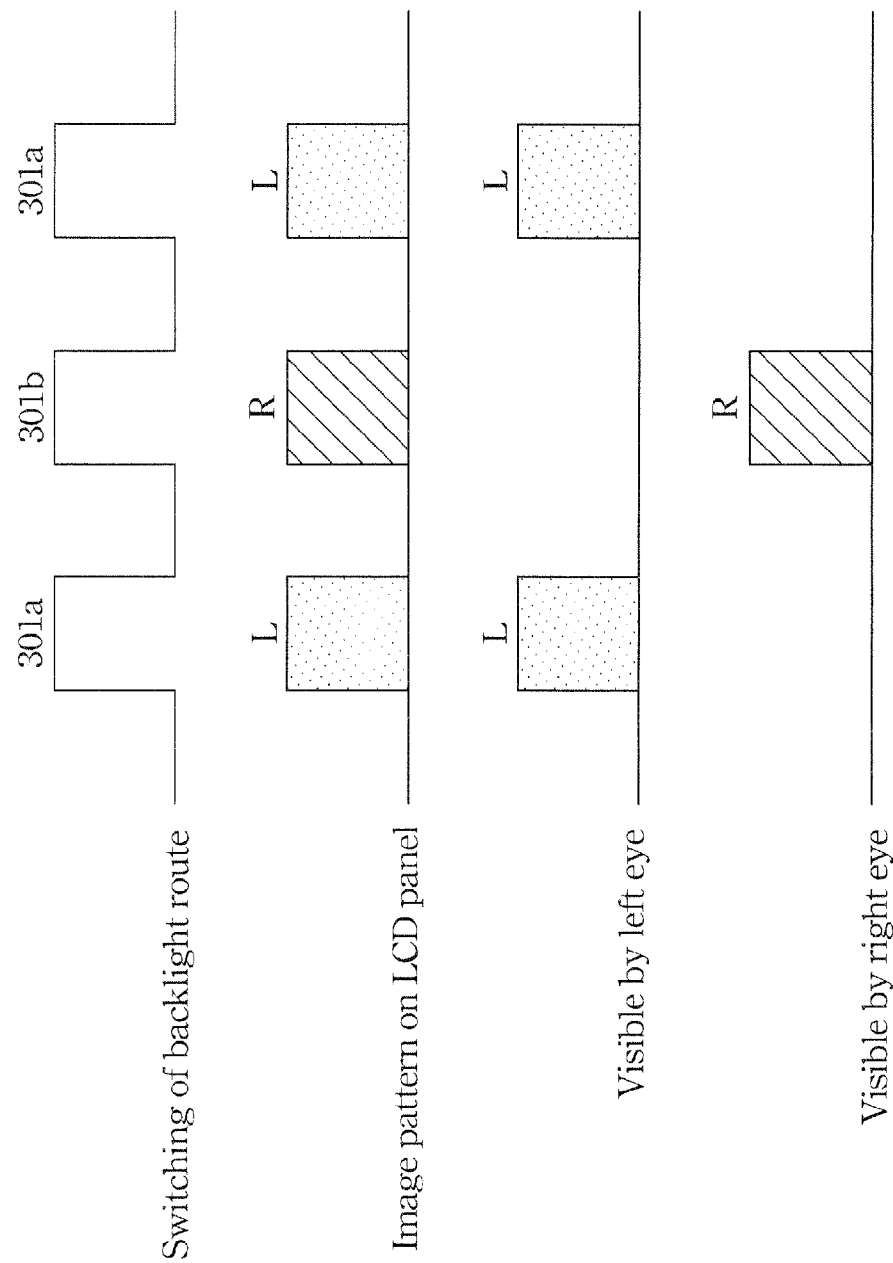
FIG. 12 illustrates an operation principle of the stereoscopic display device according to the third embodiment of this invention.

Reference is made to FIG. 12, which illustrates an operation principle of the stereoscopic display device according to the third embodiment of this invention. This drawing is used to describe the major function of the synchronization module 312. The light source 301 provides two different types of polarized backlights via two backlight routes (301a, 301b), which alternately illuminates the display panel 306. The display panel 306 alternately generates left-eye visible images (L) and right-eye visible images (R) with full resolutions. The major function of the synchronization module 312 is used to synchronize the switch cycle or the switch shutter 302a with the left-eye visible image (L) and synchronize the switch cycle of the switch shutter 302b with the right-eye visible image (R). Therefore, when the viewer wears the polarizer glasses, his or her right eye can see the right-eye visible image (R) while his or her left eye can see the left-eye visible image (L) so as to form a stereoscopic image.

In an alternate embodiment, the display panels 103, 206, 306 may be used to alternately generate first visible images for a first viewer, who wears a first type of polarizer glasses, and second visible images for a second viewer, who wears a second type of polarizer glasses. With the aid of the synchronization modules (112, 212, 312), the first visible images and second visible images can be synchronized with the switch cycle of illumination periods of the respective polarized backlights. Therefore, two viewers can watch their desired video images via a single display panel.

According to the above-discussed embodiments, the display device disclosed herein utilizes two different types of polarized backlights to alternately illuminates the display panel for alternately generates first visible images and second visible images, thereby combining to form stereoscopic visible images or for two viewers who watch two different visible images. Besides, the display panel generates first visible images and second visible images with full resolutions, rather than conventional first visible images and second visible images with half resolutions, thereby not sacrificing the resolution of the image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

What is claimed is:

1. A display device comprising:
   a display panel for alternately generating first visible images and second visible images;
   a backlight module for generating two different polarized backlights to alternately illuminate the display panel so as to output the first visible images and second visible images respectively, wherein the backlight module comprises:
      a single light source;
      a first polarizing beam splitter for splitting light beams from the single light source into two different groups of polarized outgoing light beams;
      a first reflector and a second reflector for reflecting the polarized light beams from the first polarizing beam splitter;
      a first switch shutter disposed between the first reflector and the first polarizing beam splitter;
      a second switch shutter disposed between the second reflector and the first polarizing beam splitter; and
      a second beam splitter for directing the light beams from the first reflector or second reflector to the display panel; and
   a synchronization module being coupled with the first switch shutter, the second switch shutter and the display panel for synchronizing the first visible images and second visible images with illumination periods of the respective polarized backlights.

2. The display device of claim 1, wherein the two different polarized backlights are two types of linearly-polarized backlights.

3. The display device of claim 2, wherein the two types of linearly-polarized backlights comprise a vertically-polarized backlight and a horizontally-polarized backlight.

4. The display device of claim 1, wherein the two different polarized backlights are two types of circularly-polarized backlights.

5. The display device of claim 4, wherein the two types of circularly-polarized backlights comprise a clockwise-polarized backlight and a counter-clockwise-polarized backlight.

6. The display device of claim 1, wherein the single light source comprises a cold-cathode fluorescent lamp.

7. The display device of claim 1, wherein the single light source comprises an LED light bar.

8. The display device of claim 1, wherein the display panel is a LCD display panel.

9. The display device of claim 1, wherein the display panel is a non-active illuminative display panel.

10. The display device of claim 1, wherein the first polarizing beam splitter is a Wollaston prism.

11. A display device comprising:
    a display panel for alternately generating first visible images and second visible images;
    a backlight module for generating two different polarized backlights to alternately illuminate the display panel so as to output the first visible images and second visible images respectively, wherein the backlight module comprises:
       a single light source;
       a first polarizing beam splitter for splitting light beams from the single light source into two different groups of polarized outgoing light beams;
       a first reflector and a second reflector for reflecting the polarized light beams from the first polarizing beam splitter;
       a first switch shutter disposed between the first reflector and the first polarizing beam splitter;
       a second switch shutter disposed between the second reflector and the first polarizing beam splitter; and a transflective prism for directing the light beams from the first reflector or second reflector to the display panel; and a synchronization module being coupled with the first switch shutter, the second switch shutter and the display panel for synchronizing the first visible images and second visible images with illumination periods of the respective polarized backlights.

12. The display device of claim 11, wherein the two different polarized backlights are two types of linearly-polarized backlights.

13. The display device of claim 12, wherein the two types of linearly-polarized backlights comprise a vertically-polarized backlight and a horizontally-polarized backlight.

14. The display device of claim 11, wherein the two different polarized backlights are two types of circularly-polarized backlights.

15. The display device of claim 14, wherein the two types of circularly-polarized backlights comprise a clockwise-polarized backlight and a counter-clockwise-polarized backlight.

16. The display device of claim 11, wherein the single light source comprises a cold-cathode fluorescent lamp.

17. The display device of claim 11, wherein the single light source comprises an LED light bar.

18. The display device of claim 11, wherein the display panel is a LCD display panel.

19. The display device of claim 11, wherein the display panel is a non-active illuminative display panel.

20. The display device of claim 11, wherein the first polarizing beam splitter is a Wollaston prism.

* * * * *

UNITED STATES PATENT AND TRADEMARK OFFICE
CERTIFICATE OF CORRECTION

Page 1 of 1

PATENT NO. : 8,687,133 B2
APPLICATION NO. : 13/211147
DATED : April 1, 2014
INVENTOR(S) : Edzer Lienson Wu It is certified that error appears in the above-identified patent and that said Letters Patent is hereby corrected as shown below:

In the Specification

Column 3,
Line 49, "glasses 105$h$" should read --glasses 105$b$--.

Column 4,
Line 17, "(104$a$, 104$h$)" should read --(104a, 104b)--.

Column 5,
Line 14, "(204$a$ or 204$h$)." should read --(204a or 204b).--.

Column 7,
Line 18, "cycle or the switch" should read --cycle of the switch--.

Signed and Sealed this
Nineteenth Day of August, 2014

Michelle K. Lee
*Deputy Director of the United States Patent and Trademark Office*